(12) United States Patent
Kamiji et al.

(10) Patent No.: US 6,286,863 B1
(45) Date of Patent: *Sep. 11, 2001

(54) PROCESS FOR DEPLOYING AIR BAG IN AIR BAG DEVICE

(75) Inventors: Koichi Kamiji; Hitoshi Higuchi; Makoto Nagai, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,331

(22) Filed: Dec. 2, 1998

(30) Foreign Application Priority Data

Dec. 5, 1997 (JP) .................................................. 9-336024

(51) Int. Cl.[7] .................................................. B60R 21/26
(52) U.S. Cl. .......................................... 280/736; 280/741
(58) Field of Search ................................... 280/736, 741, 280/742, 731, 735; 102/530, 531

(56) References Cited

U.S. PATENT DOCUMENTS

| | | | |
|---|---|---|---|
| 4,243,248 | * 1/1981 | Scholz et al. | 280/741 |
| 5,219,178 | * 6/1993 | Kobari et al. | 280/736 |
| 5,470,104 | * 11/1995 | Smith et al. | 280/741 |
| 5,564,743 | * 10/1996 | Marchant | 280/741 |
| 5,794,973 | * 8/1998 | O'Loughlin et al. | 280/737 |
| 5,839,754 | * 11/1998 | Schulter et al. | 280/736 |
| 5,880,534 | * 3/1999 | Mossi et al. | 280/736 |
| 5,992,881 | * 11/1999 | Faigle | 280/737 |
| 6,019,389 | * 2/2000 | Burgi et al. | 280/736 |
| 6,024,379 | * 2/2000 | Blumenthal et al. | 280/737 |
| 6,032,979 | * 3/2000 | Mossi et al. | 280/736 |
| 6,142,518 | * 11/2000 | Butt et al. | 280/741 |
| 6,143,103 | * 11/2000 | Ryder | 280/741 |

FOREIGN PATENT DOCUMENTS

| | | | |
|---|---|---|---|
| 609 981A2 | * 8/1994 | (EP) | 280/736 |
| 52-44094 | 11/1977 | (JP) . | |
| 2-293234 | 12/1990 | (JP) . | |
| 2-310143 | 12/1990 | (JP) . | |

* cited by examiner

Primary Examiner—Kenneth R. Rice
Assistant Examiner—Lynda Jasmin
(74) Attorney, Agent, or Firm—Armstrong, Westerman, Hattori, McLeland & Naughton, LLP

(57) ABSTRACT

An inflater of an air bag device is provided which includes a first combustor, providing an output having a peak value Ma and a second combustor, providing an output having a peak value Mb (wherein Mb<Ma). After ignition of the first combustor, the second combustor is ignited with a time lag. The igniting timing of the second combustor is set later than a time point at which the peak value of the sum of the outputs from the first and second combustors can be equalized to the peak value Ma of the output from the first combustor, and earlier-than a time point at which the combustion of the first combustor is finished. Thus, it is possible to prevent the sudden deployment of the air bag to moderate the shock applied to the occupant, while ensuring the smooth deployment of the air bag. The purpose of the inflater of an air bag device is to ensure that, in an air bag device including two gas generating devices which provide different outputs, the timing of the ignition of the two gas generating devices are appropriately controlled to moderate the shock received by an occupant upon deployment of the air bag.

9 Claims, 6 Drawing Sheets

PROCESS FOR DEPLOYING AIR BAG IN AIR BAG DEVICE

TECHNICAL FIELD OF THE INVENTION

The present invention relates to an air bag device designed so that an air bag is expanded by a gas, generated by a gas generating means, upon collision of a vehicle, to hold back an occupant.

DESCRIPTION OF THE RELATED ART

An inflater mounted in an air bag device for an automobile is generally adapted to generate a high-pressure gas by burning of a gas generating agent. The profile of the amount of gas generated per unit time by the inflater is such that the amount of gas generated is steeply increased simultaneously with the ignition and, after reaching a peak value, gently decreased. However, when the air bag is expanded by the inflater having such an output profile, the following problem is encountered: the air bag is suddenly deployed, thereby making it difficult to gently hold back the occupant.

There are air bag devices known from Japanese Patent Application Laid-open Nos. 2-293234 and 2-310143 and Japanese Patent Publication No. 52-44094, each of which includes a plurality of inflaters mounted so that they are operated with time lags, thereby preventing the sudden deployment of the air bag.

To moderate the shock received by an occupant upon deployment of the air bag, it is preferable that the output profile of the inflater is changed from having a peaky characteristic to having a flat characteristic.

The present invention has been accomplished with the above circumstance in view, and it is an object of the present invention to ensure that in an air bag device including two gas generating means providing different outputs, the timing of the ignition of two gas generating means are appropriately controlled to moderate the shock received by an occupant upon deployment of the air bag.

SUMMARY OF THE INVENTION

To achieve the above-described object, a process for deploying an air bag is provided in an air bag device comprising gas generating means having an output characteristic that the amount of gas generated per unit time subsequent to an ignition is gradually increased from zero to a peak value and then gradually decreased from the peak value to zero, so that the air bag is expanded by the gas generated by the gas generating means to hold back an occupant, wherein the gas generating means comprises a first gas generating means and a second gas generating means providing the peak value smaller than that of the first gas generating means; the process comprises steps of igniting the first gas generating means upon collision of a vehicle and then, igniting the second gas generating means; timing an ignition of the second gas generating means, so that the sum of the peak value of the output from the second gas generating means and the output from the first gas generating means at the time when such peak value of the second gas generating means is provided, is any one of equal to and smaller than the peak value outputted from the first gas generating means; and timing the ignition of the second gas generating means, before the output from the first gas generating means becomes zero.

With the above feature, the first gas generating means, providing the larger output, is first ignited upon collision of the vehicle to generate the high-pressure gas, and after such output exceeds the peak value, a first second gas generating means, providing the smaller output, is ignited to generate the high-pressure gas. Therefore, the sum of the outputs from the first and second gas generating means has the peak value, and output characteristic as a whole is flat. Moreover, the second peak value is equal to or smaller than the first peak value, and the generation of the high-pressure gas cannot be intermitted. Therefore, it is possible to prevent the sudden deployment of the air bag to moderate the shock applied to the occupant, while ensuring the smooth deployment of the air bag.

BRIEF DESCRIPTION OF THE DRAWING FIGURES

DETAILED DESCRIPTION OF THE INVENTION

The mode for carrying out the present invention will now be described by way of embodiments shown in the accompanying drawings.

FIGS. 1 to 5 show a first embodiment of the present invention.

Figure 1:
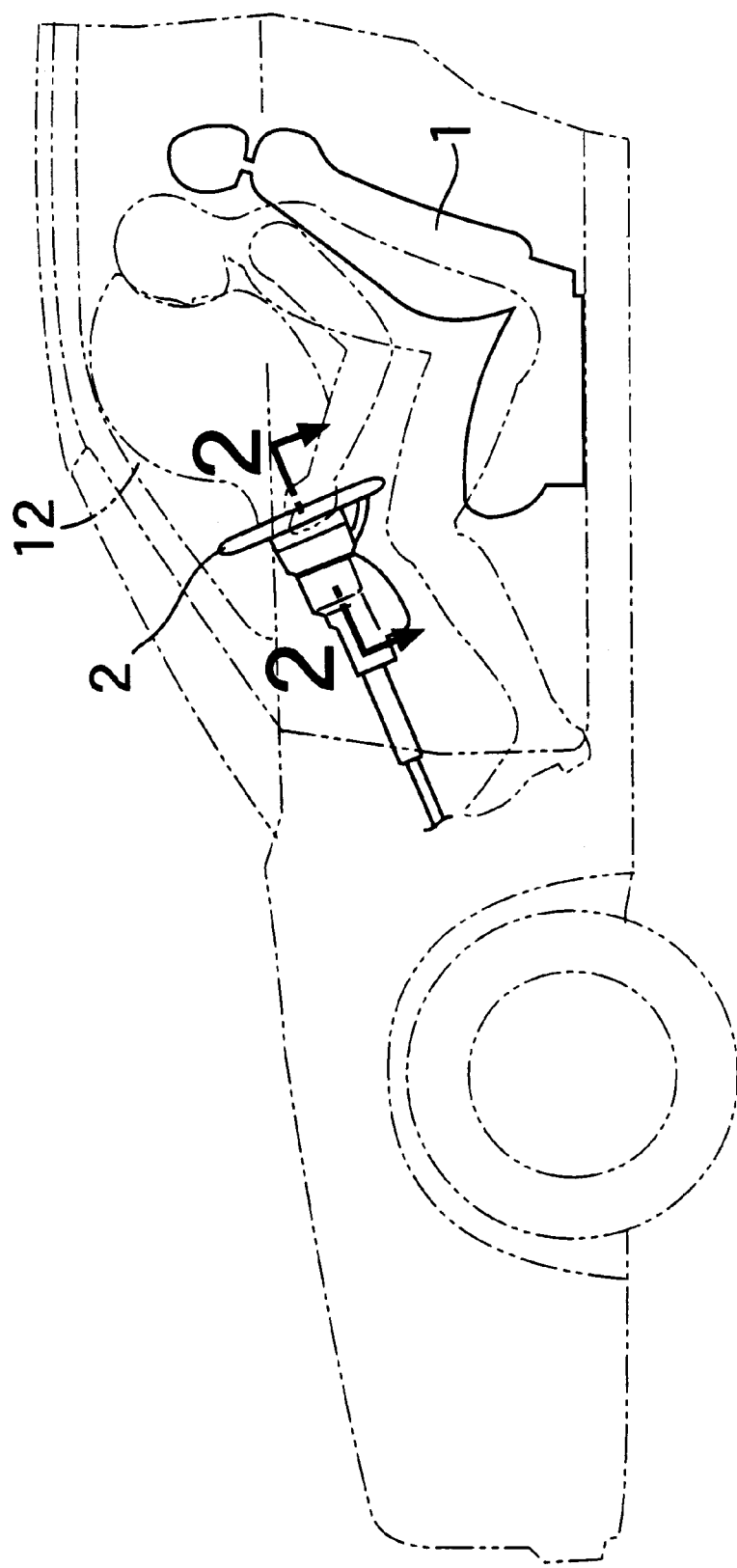
FIG. 1 is a partial side view of a vehicle having an air bag device mounted therein for a driver's seat.

As shown in FIG. 1, an air bag device is mounted within a steering wheel 2 to hold back a driver sitting on a seat 1 upon collision of a vehicle.

Figure 2:
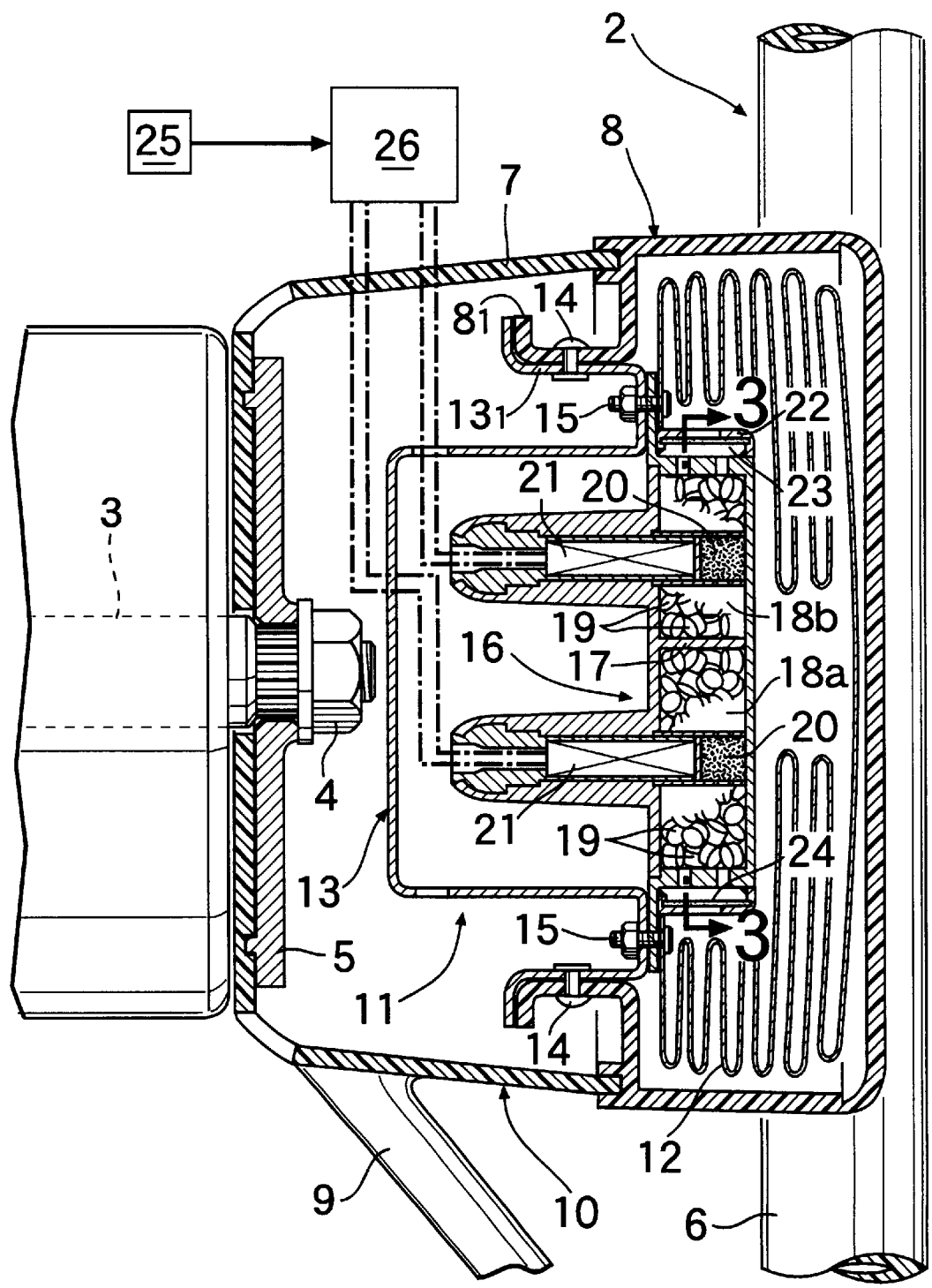
FIG. 2 is an enlarged cross-sectional view taken along a line 2—2 in FIG. 1.
Figure 3:
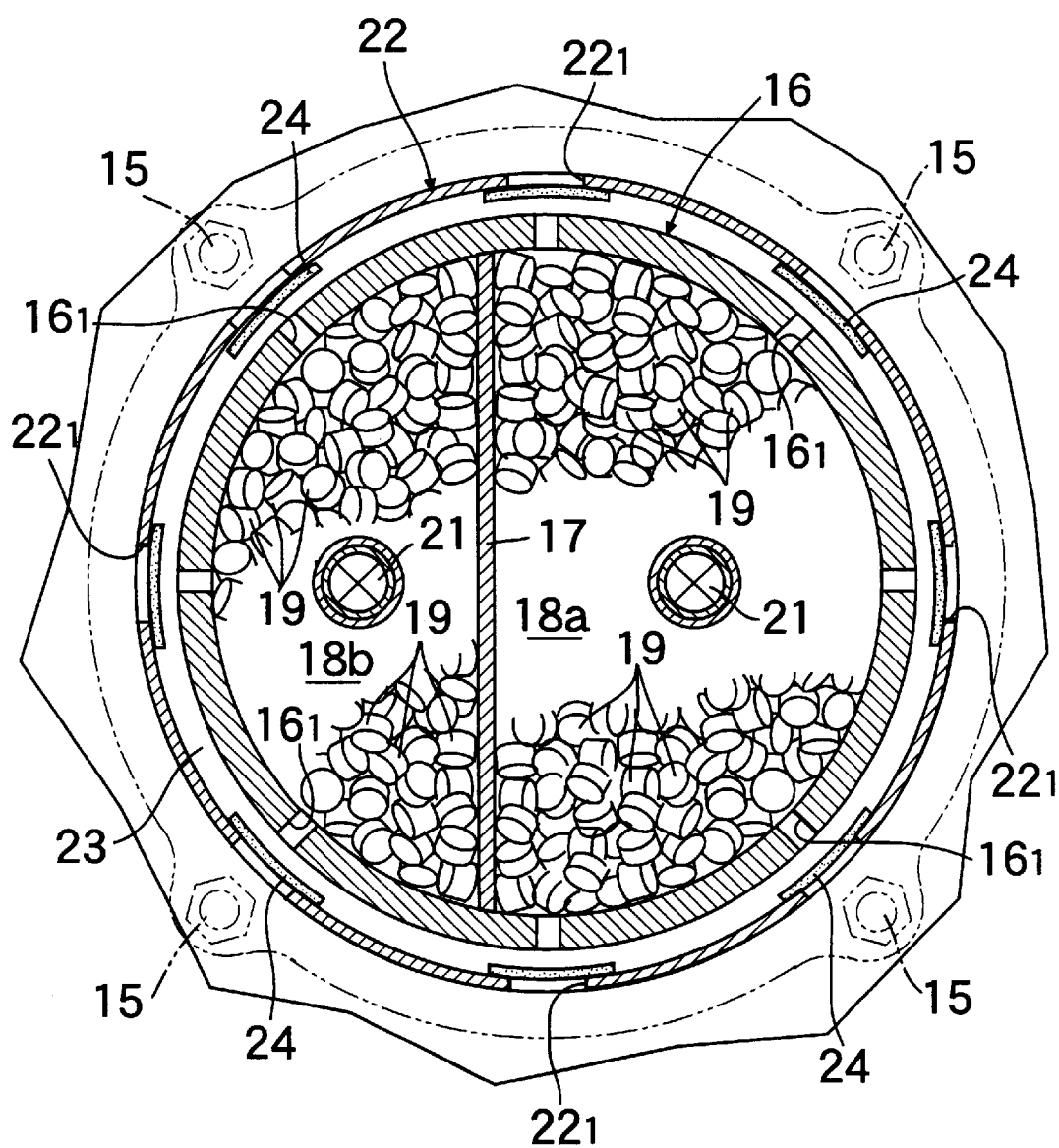
FIG. 3 is a cross-sectional view taken along a line 3—3 in FIG. 2.

As shown in FIGS. 2 and 3, the steering wheel 2 includes: a steering boss 5 non-rotatably fitted to a rear end of a steering shaft 3 and fixed by a nut 4; an annular wheel rim 6 disposed to surround the steering boss 5; a front cover 7 fixed to the steering boss 5; a rear cover 8 coupled to the front cover 7; and a plurality of spokes connecting the front cover 7 to the wheel rim 6. An air bag module 10 is accommodated in a space defined by the front cover 7 and the rear cover 8.

The air bag module 10 is comprised of an inflater 11 which generates a high pressure gas, and an air bag 12 which can be expanded by the high pressure gas generated by the inflater 11. The inflater 11 includes a cup-shaped cover member 13, and a mounting flange 13$_1$ is integrally formed on an outer periphery of the cover member 13 and fixed by a plurality of rivets 14 to a mounting flange 8$_1$ which is integrally formed on an inner periphery of the rear cover 8. A first combustor 18$a$ and a second combustor 18$b$, partitioned by a partition wall 17, are defined within a combustor housing 16 which is fixed to the cover member 13 by a plurality of bolts 15. The volume of the first combustor 18$a$ is set larger than that of the second combustor 18$b$, and a gas generating agent 19 is filled in each of the combustors 18$a$ and 18$b$ in an amount depending on the volume of the combustors 18$a$ and 18$b$.

Igniting agents 20 are disposed within the first combustor 18$a$ and the second combustor 18$b$, respectively, and tip ends of two ignitors 21, extending from a front surface of the combustor housing 16 into the first combustor 18a and the second combustor 18b, face the igniting agents 20, respectively. The air bag 12 is fixed at its base portion to an outer periphery of the combustor housing 16 by the plurality of bolts 15 in a state in which it surrounds the combustor housing 16. The air bag 12 is accommodated in a folded-up state in a space provided between the combustor housing 16 and the rear cover 8.

By fixing an outer housing 22 to an outer peripheral surface of the combustor housing 16, an annular space 23 is defined between the combustor housing 16 and the outer housing 22. The annular space 23 communicates with the insides of the first and second combustors 18a and 18b through a plurality of gas passages $16_1$ defined in the outer peripheral surface of the combustor housing 16, and also communicates with an internal space in the air bag 12 through a plurality of gas passages $22_1$ defined in the outer housing 22. Filters 24 are mounted in the plurality of gas passages $22_1$ defined in the outer housing 22 for inhibiting dusts generated by combustion of the gas generating agents 19 from being supplied to the air bag 12.

An ignition control device 26, which receives a signal from an acceleration sensor 25 for detecting an acceleration in a longitudinal direction of the vehicle, expands the air bag 12 by supplying electric current to the two ignitors 21 to operate the inflater 11, when an acceleration equal to or larger than a predetermined value is detected upon collision of the vehicle.

Figure 4:
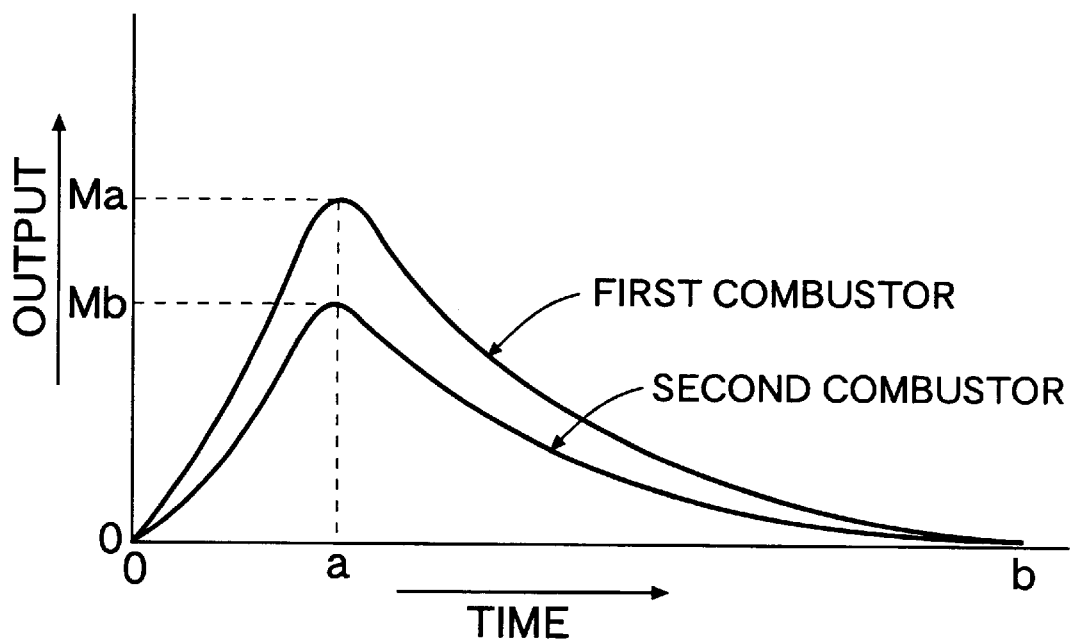
FIG. 4 is a graph showing the output characteristics of a first combustor and a second combustor.

When the gas generating agents 19, filled in the first combustor 18a, are ignited and burned, the amount of gas generated per unit time (i.e., the output from the first combustor 18a) is gradually increased from 0 (zero) toward a peak value Ma and then gradually decreased from the peak value Ma toward 0, as shown in FIG. 4, and hence, an entirely mountain-shaped output characteristic is obtained. Since the volume of the first combustor 18a is set larger than that of the second combustor 18b and the gas generating agents 19 are filled in both the combustors 18a and 18b in the amount depending on the volume of the combustors 18a and 18b, as described above, the mountain shape of the output characteristic of the second combustor 18b is smaller than that of the output characteristic of the first combustor 18a, and the peak value Mb of the output from the second combustor 18b is smaller than the peak value Ma of the output from the first combustor 18a. In the present embodiment, the time points a, when the peak value of the output is provided, as well as the time points b, when the output becomes 0 (zero), are the same in the first and second combustors 18a and 18b, but may be different in the first and second combustors 18a and 18b.

The operation of the embodiment of the present invention having the above-described arrangement will be described below.

When the ignition control device 26 has determined a shock equal to or larger than a predetermined value permitting the air bag 12 to be deployed, based on the acceleration signal from the acceleration sensor 25 upon collision of the vehicle, the ignition control device 26 outputs an igniting command to operate the ignitor 21 of the first combustor 18a, whereby the igniting agent 20 is fired to start the burning of the gas generating agents 19. The high-pressure gas generated by the burning of the gas generating agents 19 spread from the gas passages $16_1$ surrounding the first combustor 18a into the annular space 23, and is then passed through the filters 24 and the gas passages $22_1$ in the outer housing 22 and supplied into the air bag 12.

Figure 5A:
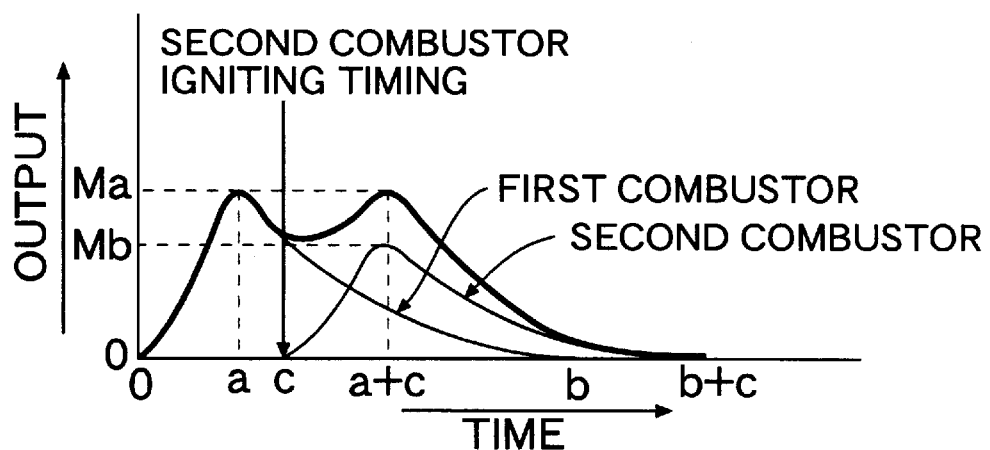
FIG. 5 is a graph showing the ignition timing and the total output characteristic of the first and second combustors.
Figure 5A:
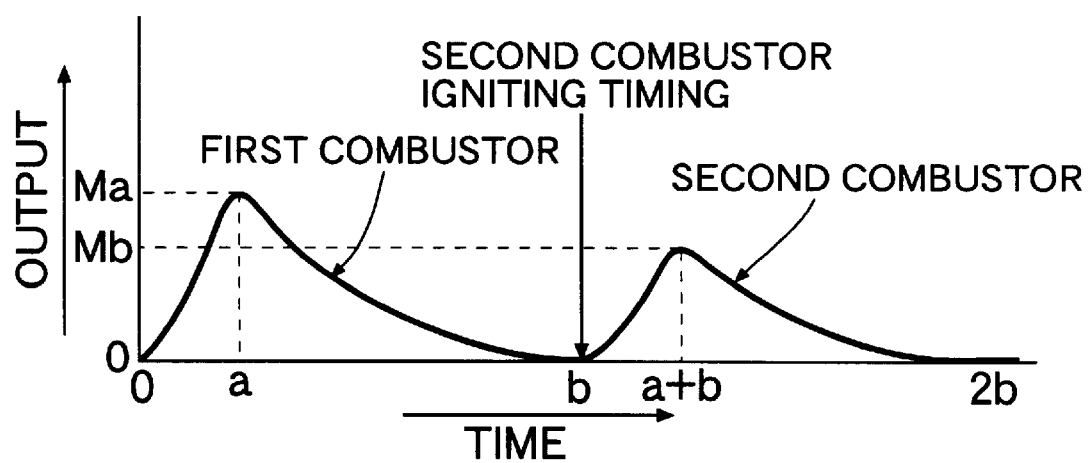

As shown in FIG. 5A, the first combustor 18a is ignited at the time point 0, and after the output from the first combustor 18a reaches the peak value Ma at the time point a, the second combustor 18b is ignited at a time point c by the igniting command from the ignition control device 26. As a result, the high-pressure gas is also generated from the second combustor 18b in addition to from the first combustor 18a, wherein the sum of the outputs from the first and second combustors 18a and 18b, shown by a thick line, is diverted again to increase and reaches a second peak value at a time point a+c when the output from the second combustor 18b becomes the peak value Mb. The time point c for igniting the second combustor 18b is set so that the second peak value at the time point a+c is equal to the first peak value Ma of the output from the first combustor 18a at the time point a.

By igniting the first combustor 18a and the second combustor 18b so as to provide the different outputs with a time lag in the above manner, the output profile is flat as a whole, as compared with the case where the first and second combustors 18a and 18b are ignited simultaneously. Thus, it is possible to weaken the shock due to sudden deployment of the air bag. Especially, the output profile can be almost flattened by setting the time point c for igniting the second combustor 18b, so that the first peak value and the second peak value are equal to each other.

If the time point for igniting the second combustor 18b is earlier than the time point c in FIG. 5A, the second peak value exceeds the first peak value Ma, thereby causing a disadvantage that the deploying speed of the air bag 12, in a moment when the air bag 12 actually contacts with an occupant, is increased, thereby increasing the shock applied to the occupant.

When the air bag 12 supplied with the high-pressure gas generated by the inflater 11 is expanded, the thinned portion of the rear cover 8 is broken by the pressure of the gas, and the air bag 12 is deployed from an opening in the broken thinned portion to hold back the occupant.

If the time point c for igniting the second combustor 18b is further latened from the state shown in FIG. 5A, the second peak value is accordingly decreased gradually from Ma toward Mb which is the peak value of the output from the second combustor 18b. However, an effect of weakening the shock due to the sudden deployment of the air bag is still exhibited by providing the first and second peak values having the time lag to the profile of the sum of the outputs from the first and second combustors 18a and 18b. However, if the time point for igniting the second combustor 18b is later than the time point b when the combustion of the first combustor 18a is finished (see FIG. 5B), there is a possibility that the supplying of the high-pressure gas is temporarily intermitted at such time point, thereby causing the deployment of the air bag 12 to be less smooth.

From the foregoing, it is appropriate that the time point for igniting the second combustor 18b is set between the timing shown in FIG. 5A and the timing shown in FIG. 5B.

Although the embodiment of the present invention has been described in detail, it will be understood that the present invention is not limited to the above-described embodiment, and various modifications may be made without departing from the subject matter of the invention.

Figure 6:
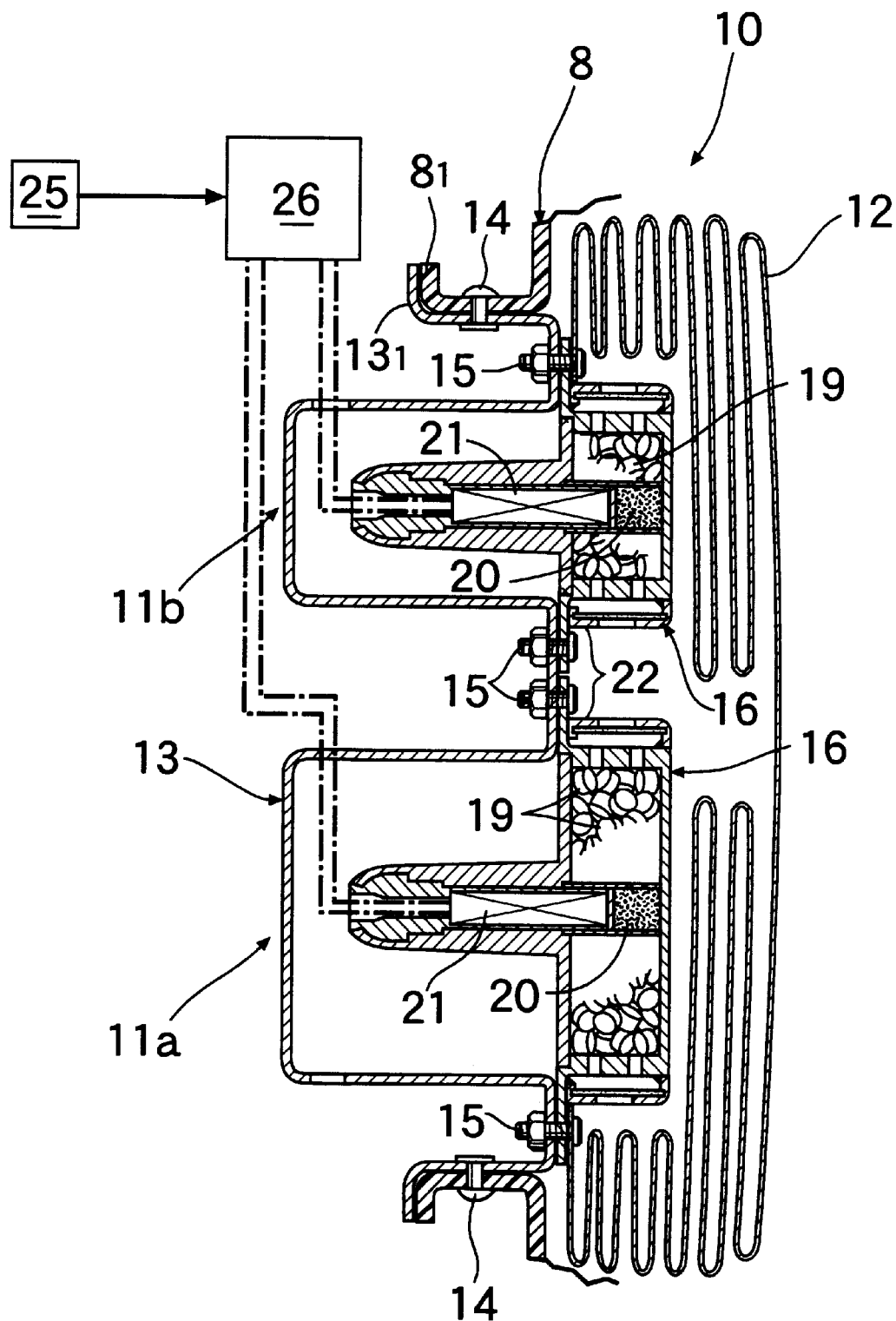
FIG. 6 is a view similar to FIG. 2, but according to a second embodiment.

For example, in the first embodiment, the air bag device includes the single inflater 11, and the first combustor 18a and the second combustor 18b, constituting the first and second gas generating means, are mounted within the inflater 11. However, as in a second embodiment shown in FIG. 6, a first inflater 11a, providing a larger output, and a second inflater 11b, providing a smaller output, may be separately mounted. In this case, the first inflater 11a constitutes the first gas generating means of the present invention, and the second inflater 11b constitutes the second gas generating means of the present invention. In addition, the air bag device for the driver's seat has been illustrated in the embodiment, but the present invention is also applicable to an air bag device for an assistant driver's seat.

As discussed above, the first gas generating means, providing the larger output, is first ignited upon collision of the vehicle to generate the high-pressure gas, and after such output exceeds the peak value, the second gas generating means, providing the smaller output, is ignited to generate the high-pressure gas. Therefore, the sum of the outputs from the first and second gas generating means has the peak value again, and the output characteristic as a whole is flat. Moreover, the second peak value is equal to or smaller than the first peak value, and the generation of the high-pressure gas cannot be intermitted. Therefore, it is possible to prevent the sudden deployment of the air bag to moderate the shock applied to the occupant, while ensuring the smooth deployment of the air bag.

What is claimed is:

1. A process for deploying an air bag device comprising:
   gas generating means having an output characteristic that an amount of gas generated per unit time subsequent to an ignition is gradually increased from a zero value to a peak value and then gradually decreased from said peak value back to said zero value, so that an air bag is expanded by said gas generated by said gas generating means to hold back an occupant, wherein said gas generating means comprises:
   a first gas generating means and a second gas generating means, said second gas generating means providing a second peak value of output smaller than a first peak value of output from said first gas generating means, said process comprising the steps of:
      igniting said first gas generating means upon collision of a vehicle and then, igniting said second gas generating means;
      timing an ignition of said second gas generating means so that a sum of said second peak value and said output from said first gas generating means, at the time when said second peak value is reached, is equal to or smaller than said first peak value; and
      timing said ignition of said second gas generating means, before said output from said first gas generating means becomes said zero value, wherein
      said first and second gas generating means provide first and second output gases, respectively, and said first and second output gases have a combined gas pressure that does not exceed said first peak value during deployment of said bag device.

2. An air bag device for deploying an air bag comprising:
   a first gas generating means for providing a first output gas to said air bag, said first output gas having a first gas pressure which reaches a maximum peak value; and
   a second gas generating means for providing a second output gas to said air bag, said second output gas having a second gas pressure, wherein
   a combined gas pressure of said first and second output gases does not exceed said maximum peak value, and said combined gas pressure of said first and second output gases is calculated after said first gas pressure reached said maximum peak value.

3. The device of claim 2, wherein said second output gas is provided at a predetermined time after said first output gas is dispensed.

4. A method for deploying an air bag device comprising the steps of:
   generating a first output gas to said air bag, said first output gas having a first gas pressure which reaches a maximum peak value; and
   generating a second output gas to said air bag, said second output gas having a second gas pressure, wherein
   a combined gas pressure of said first and second output gases does not exceed said maximum peak value, and said combined gas pressure of said first and second output gases is calculated after said first gas pressure reached said maximum peak value.

5. The method of claim 4, wherein said second output gas is provided in a predetermined time after said first output gas is dispensed.

6. An air bag device for deploying an air bag comprising:
   a first gas generating means for providing a first output gas to said air bag, said first output gas having a first gas pressure which reaches a first gas pressure maximum peak value, then decreases to zero; and
   a second gas generating means for providing a second output gas to said air bag, said second output gas having a second gas pressure which reaches a second gas pressure maximum peak value after said first gas pressure has reached said first gas pressure maximum peak value and before said first gas pressure has decreased to zero,
   wherein a sum of said first gas pressure and said second gas pressure does not exceed said first gas pressure maximum peak value, and said sum of said first gas pressure and said second gas pressure is calculated after said first gas pressure reached said maximum peak value.

7. The device of claim 6, wherein said second output gas is provided at a predetermined time after said first output gas is dispensed.

8. A method for deploying an air bag device comprising the steps of:
   generating a first output gas to said air bag, said first output gas having a first gas pressure which reaches a first gas pressure maximum peak value then decreases to zero; and
   generating a second output gas to said air bag, said second output gas having a second gas pressure which reaches a second gas pressure maximum peak value after said first gas pressure has reached said first gas pressure maximum peak value and before said first gas pressure has decreased to zero,
   wherein a sum of said first gas pressure and said second gas pressure does not exceed said maximum peak value and said sum of said first gas pressure, and said second gas pressure is calculated after said first gas pressure reached said maximum peak value.

9. The method of claim 8, wherein said second output gas is provided at a predetermined time after said first output gas is dispensed.

* * * * *